United States Patent
Selvaganapathy et al.

(10) Patent No.: US 10,813,019 B2
(45) Date of Patent: Oct. 20, 2020

(54) CELL RESELECTION CONTROL MECHANISM IN MULTI-CONNECTIVITY COMMUNICATION MODE

(71) Applicant: Nokia Solutions and Networks Oy, Espoo (FI)

(72) Inventors: Srinivasan Selvaganapathy, Bangalore (IN); Tsunehiko Chiba, Saitama (JP); Tero Henttonen, Espoo (FI); Yang Liu, Beijing (CN)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/573,816

(22) PCT Filed: May 10, 2016

(86) PCT No.: PCT/FI2016/050308
§ 371 (c)(1),
(2) Date: Nov. 13, 2017

(87) PCT Pub. No.: WO2016/181040
PCT Pub. Date: Nov. 17, 2016

(65) Prior Publication Data
US 2018/0352488 A1  Dec. 6, 2018

(30) Foreign Application Priority Data
May 13, 2015 (IN) .......................... 1338/DEL/2015

(51) Int. Cl.
*H04W 36/04* (2009.01)
*H04W 48/16* (2009.01)
(Continued)

(52) U.S. Cl.
CPC .......... *H04W 36/04* (2013.01); *H04W 36/28* (2013.01); *H04W 48/08* (2013.01); *H04W 48/16* (2013.01);
(Continued)

(58) Field of Classification Search
CPC ..... H04W 76/15; H04W 76/27; H04W 36/28; H04W 48/16; H04W 36/04; H04W 48/08; H04W 8/22; H04W 84/045
See application file for complete search history.

(56) References Cited

U.S. PATENT DOCUMENTS

2008/0176565 A1  7/2008 Eerolainen et al.
2010/0093350 A1  4/2010 Wang et al.
(Continued)

FOREIGN PATENT DOCUMENTS

EP  2111074 A1  10/2009
EP  2563049 A1  2/2013
(Continued)

OTHER PUBLICATIONS

International Search Report and Written Opinion received for corresponding Patent Cooperation Treaty Application No. PCT/FI2016/050308, dated Jun. 22, 2016, 13 pages.
(Continued)

*Primary Examiner* — Wayne H Cai
(74) *Attorney, Agent, or Firm* — Harrington & Smith

(57) ABSTRACT

An apparatus comprising at least one processing circuitry, and at least one memory for storing instructions to be executed by the processing circuitry, wherein the at least one memory and the instructions are configured to, with the at least one processing circuitry, cause the apparatus at least: to prepare configuration information regarding cell reselection in a communication network for at least one communication element capable of communicating in a multi-connectivity
(Continued)

communication mode, wherein the configuration information comprises at least one preservation scope indication related to at least one cell reselection priority indication which indicates that priority is to be assigned to a first type of cells of the communication network for cell reselection, compared to other types of cells of the communication network, wherein the at least one preservation scope indication indicates at least one cell across which the at least one cell reselection priority indication is to be maintained, and to provide the configuration information for configuring the at least one communication element capable of communicating in the multi-connectivity communication mode.

34 Claims, 8 Drawing Sheets

(51) Int. Cl.
    *H04W 76/15*     (2018.01)
    *H04W 48/08*     (2009.01)
    *H04W 76/27*     (2018.01)
    *H04W 36/28*     (2009.01)
    *H04W 8/22*     (2009.01)
    *H04W 84/04*     (2009.01)

(52) U.S. Cl.
    CPC ........... *H04W 76/15* (2018.02); *H04W 76/27* (2018.02); *H04W 8/22* (2013.01); *H04W 84/045* (2013.01)

(56) References Cited

U.S. PATENT DOCUMENTS

| | | | |
|---|---|---|---|
| 2012/0281655 | A1 | 11/2012 | Jung et al. |
| 2013/0107863 | A1* | 5/2013 | Faccin ............. H04W 36/0022 370/331 |
| 2015/0163690 | A1* | 6/2015 | Pani ...................... H04W 24/10 370/252 |
| 2019/0045480 | A1* | 2/2019 | Horn ..................... H04W 48/18 |

FOREIGN PATENT DOCUMENTS

| | | |
|---|---|---|
| EP | 2660124 A2 | 11/2013 |
| EP | 2663124 A2 | 11/2013 |
| WO | 2014/025196 A1 | 2/2014 |
| WO | 2014038910 A1 | 3/2014 |
| WO | 2014/163143 A1 | 10/2014 |
| WO | 2015/065129 A1 | 5/2015 |

OTHER PUBLICATIONS

"3rd Generation Partnership Project; Technical Specification Group Radio Access Network; Evolved Universal Terrestrial Radio Access (E-UTRA); Study on Small Cell Enhancements for E-UTRA and E-UTRAN—Higher layer aspects (Release 12)", 3GPP TR 36.842, V1.0.0, Nov. 2013, 69 pages.

"New Work Item Description: Dual Connectivity for LTE", 3GPP TSG-RAN meeting #62, RP-132069, Agenda: 13.1.2, NTT Docomo, Inc, Dec. 3-6, 2013, 7 pages.

"Idle Mode Load Balancing Improvements", 3GPP TSG-RAN Working Group 2 meeting #85bis, R2-141314, Agenda: 7.10.1, Ericsson, Mar. 31-Apr. 4, 2014, pp. 1-7.

Extended European Search Report received for corresponding European Patent Application No. 16792249.1, dated Oct. 31, 2018, 10 pages.

"3rd Generation Partnership Project; Technical Specification Group Radio Access Network; Evolved Universal Terrestrial Radio Access (E-UTRA); User Equipment (UE) procedures in idle mode (Release 12)", 3GPP TS 36.304, V12.4.0, Mar. 2015, pp. 1-38.

\* cited by examiner

CELL RESELECTION CONTROL MECHANISM IN MULTI-CONNECTIVITY COMMUNICATION MODE

RELATED APPLICATION

This application was originally filed as Patent Cooperation Treaty Application No. PCT/FI2016/050308 filed May 10, 2016 which claims priority benefit to Indian Patent Application No. 1338/DEL/2015, filed May 13, 2015.

BACKGROUND

Field

The present invention relates to apparatuses, methods, systems, computer programs, computer program products and computer-readable media usable for conducting or controlling a cell reselection procedure controlling location change reporting in a multi-connectivity communication mode.

Background Art

The following description of background art may include insights, discoveries, understandings or disclosures, or associations, together with disclosures not known to the relevant prior art, to at least some examples of embodiments of the present invention but provided by the invention. Some of such contributions of the invention may be specifically pointed out below, whereas other of such contributions of the invention will be apparent from the related context.

The following meanings for the abbreviations used in this specification apply:
3GPP 3$^{rd}$ Generation Partnership Project
AS: access stratum
BS: base station
CPU: central processing unit
DC: dual connectivity
DL: downlink
E-UTRAN: evolved UMTS terrestrial radio access network
EARFCN: E-UTRAN absolute radio frequency channel number
ECGI: E-UTRAN cell global identifier
IP: Internet protocol
LTE: Long Term Evolution
LTE-A: LTE Advanced
MCG master cell group
MeNB master eNB
MME mobility management entity
NAS non-access stratum
PCell primary cell
PCI: physical cell identifier
PLMN: public land mobile network
PSCell primary secondary cell
RAN radio access network
RRC radio resource control
SCell secondary cell
SCG: secondary cell group
SeNB: secondary eNB
SGW: serving gateway
SIB system information block
TA tracking area
TAC: tracking area code
TAI: tracking area identity
TAU tracking area update
UE: user equipment
UL: uplink
UMTS: universal mobile telecommunication services
VNF: virtual network function Embodiments of the present invention are related to a communication system in which a suitable architecture, procedure and protocol are provided related to a functionality allowing a communication using multi-connectivity mode, such as a dual connectivity mode, wherein a cell reselection procedure is conducted.

SUMMARY

According to an example of an embodiment, there is provided, for example, an apparatus comprising at least one processing circuitry, and at least one memory for storing instructions to be executed by the processing circuitry, wherein the at least one memory and the instructions are configured to, with the at least one processing circuitry, cause the apparatus at least: to prepare configuration information regarding cell reselection in a communication network for at least one communication element capable of communicating in a multi-connectivity communication mode, wherein the configuration information comprises at least one preservation scope indication related to at least one cell reselection priority indication which indicates that priority is to be assigned to a first type of cells of the communication network for cell reselection, compared to other types of cells of the communication network, wherein the at least one preservation scope indication indicates at least one cell across which the at least one cell reselection priority indication is to be maintained, and to provide the configuration information for configuring the at least one communication element capable of communicating in the multi-connectivity communication mode.

Furthermore, according to an example of an embodiment, there is provided, for example, a method comprising preparing configuration information regarding cell reselection in a communication network for at least one communication element capable of communicating in a multi-connectivity communication mode, wherein the configuration information comprises at least one preservation scope indication related to at least one cell reselection priority indication which indicates that priority is to be assigned to a first type of cells of the communication network for cell reselection, compared to other types of cells of the communication network, wherein the at least one preservation scope indication indicates at least one cell across which the at least one cell reselection priority indication is to be maintained, and providing the configuration information for configuring the at least one communication element capable of communicating in the multi-connectivity communication mode.

According to further refinements, these examples may include one or more of the following features:
  the configuration information may be related to a configuration of the at least one communication element capable of communicating in the multi-connectivity communication mode in an idle state, wherein the at least one cell reselection priority indication may to be signaled by means of a dedicated cell reselection priority configuration signaling;
  the at least one preservation scope indication may include, for indicating the at least one cell across which the at least one cell reselection priority indication is to be maintained, at least one of a tracking area, an absolute radio frequency channel number and a channel identifier;

the configuration information may further comprise timer information indicating a time during which the at least one preservation scope indication or the at least one cell reselection priority indication is valid;

the configuration information may be provided by one of an access stratum signaling, a non-access stratum signaling, a radio resource control configuration signaling, and a signaling via an interface towards an access network element or function;

the first type of cells of the communication network may includes cell of a macro-cell layer of a heterogeneous network structure of the communication network;

the processing may be implemented in a core network element or function configured to act as a mobility management entity of the communication network, wherein the at least one communication element may include at least one of a terminal device or user equipment.

Moreover, according to an example of an embodiment, there is provided, for example, an apparatus comprising at least one processing circuitry, and at least one memory for storing instructions to be executed by the processing circuitry, wherein the at least one memory and the instructions are configured to, with the at least one processing circuitry, cause the apparatus at least: to receive and process configuration information regarding cell reselection in a communication network for at least one communication element capable of communicating in a multi-connectivity communication mode, wherein the configuration information comprises at least one preservation scope indication related to at least one cell reselection priority indication which indicates that priority is to be assigned to a first type of cells of the communication network for cell reselection, compared to other types of cells of the communication network, wherein the at least one preservation scope indication indicates at least one cell across which the at least one cell reselection priority indication is to be maintained, and to cause transmission of the configuration information including the at least one preservation scope indication together with at least one cell reselection priority indication to which the at least one preservation scope indication is related, to the at least one communication element capable of communicating in the multi-connectivity communication mode.

Furthermore, according to an example of an embodiment, there is provided, for example, a method comprising receiving and processing configuration information regarding cell reselection in a communication network for at least one communication element capable of communicating in a multi-connectivity communication mode, wherein the configuration information comprises at least one preservation scope indication related to at least one cell reselection priority indication which indicates that priority is to be assigned to a first type of cells of the communication network for cell reselection, compared to other types of cells of the communication network, wherein the at least one preservation scope indication indicates at least one cell across which the at least one cell reselection priority indication is to be maintained, and causing transmission of the configuration information including the at least one preservation scope indication together with at least one cell reselection priority indication to which the at least one preservation scope indication is related, to the at least one communication element capable of communicating in the multi-connectivity communication mode.

According to further refinements, these examples may include one or more of the following features:

the configuration information may be related to a configuration of the at least one communication element capable of communicating in the multi-connectivity communication mode in an idle state, wherein the at least one cell reselection priority indication may be signaled by means of a dedicated cell reselection priority configuration signaling;

the at least one preservation scope indication may include, for indicating the at least one cell across which the at least one cell reselection priority indication is to be maintained, at least one of a tracking area, an absolute radio frequency channel number and a channel identifier;

the configuration information may further comprise timer information indicating a time during which the at least one preservation scope indication or the at least one cell reselection priority indication is valid, wherein further a timer according to the timer information may be triggered, wherein at an expiry of the timer the configuration information is discarded, or the timer information may be forwarded together with the configuration information to the at least one communication element;

the configuration information may be received by one of an access stratum signaling, a non-access stratum signaling, a radio resource control configuration signaling, and a signaling via an interface towards an access network element or function;

the configuration information may be sent by one of an access stratum signaling, a non-access stratum signaling, and a radio resource control configuration signaling;

transmission of the configuration information together with the at least one cell reselection priority indication to which the at least one preservation scope indication is related to the at least one communication element capable of communicating in the multi-connectivity communication mode may be caused when a transition of a communication state of the at least one communication element from a connected state to an idle state is determined;

the first type of cells of the communication network may include cells of a macro-cell layer of a heterogeneous network structure of the communication network;

the processing may be implemented in a communication network control element or function configured to act as a base station or evolved node B of the communication network, wherein the configuration information may be received from a core network element or function configured to act as a mobility management entity of the communication network, and the at least one communication element may include at least one of a terminal device or user equipment.

In addition, according to an example of an embodiment, there is provided, for example, an apparatus comprising at least one processing circuitry, and at least one memory for storing instructions to be executed by the processing circuitry, wherein the at least one memory and the instructions are configured to, with the at least one processing circuitry, cause the apparatus at least: to receive and process configuration information regarding cell reselection in a communication network together with at least one cell reselection priority indication to which the at least one preservation scope indication is related, the at least one cell reselection priority indication indicates that priority is to be assigned to a first type of cells of the communication network for cell reselection, compared to other types of cells of the communication network, wherein the configuration information comprises at least one preservation scope indication related to the at least one cell reselection priority indication, wherein the at least one preservation scope indication indicates at least one cell across which the at least one cell reselection priority indication is to be maintained, and to conduct a cell reselection procedure considering the configuration information and the at least one cell reselection priority indication.

Furthermore, according to an example of an embodiment, there is provided, for example, a method comprising receiving and processing configuration information regarding cell reselection in a communication network together with at least one cell reselection priority indication to which the at least one preservation scope indication is related, the at least one cell reselection priority indication indicates that priority is to be assigned to a first type of cells of the communication network for cell reselection, compared to other types of cells of the communication network, wherein the configuration information comprises at least one preservation scope indication related to the at least one cell reselection priority indication, wherein the at least one preservation scope indication indicates at least one cell across which the at least one cell reselection priority indication is to be maintained, and conducting a cell reselection procedure considering the configuration information and the at least one cell reselection priority indication.

According to further refinements, these examples may include one or more of the following features:

- the configuration information may be related to a configuration for an idle state, wherein the at least one cell reselection priority indication is signaled by means of a dedicated cell reselection priority configuration signaling;
- the at least one preservation scope indication may include, for indicating the at least one cell across which the at least one cell reselection priority indication is to be maintained, at least one of a tracking area, an absolute radio frequency channel number and a channel identifier;
- the configuration information may further comprise timer information indicating a time during which the at least one preservation scope indication or the at least one cell reselection priority indication is valid, wherein a timer according to the timer information may be triggered, wherein at an expiry of the timer the configuration information is discarded;
- the configuration information may be received by at least one of an access stratum signaling, a non-access stratum signaling, and a radio resource control configuration signaling;
- the configuration information may be received together with the at least one cell reselection priority indication to which the at least one preservation scope indication is related, from a communication network control element when a transition of a communication state from a connected state to an idle state is to be conducted;
- the first type of cells of the communication network may include cells of a macro-cell layer of a heterogeneous network structure of the communication network;
- when conducting the cell reselection procedure considering the configuration information and the at least one cell reselection priority indication, the indicated at least one cell reselection priority in the at least one cell indicated in the preservation scope indication may be maintained;

it may be determined whether a cell currently being a serving cell is part of the at least one cell indicated in the preservation scope indication, if the determination is positive, the at least one cell reselection priority indication, to which the preservation scope indication is related, may be used as at least one of criteria for the cell reselection procedure, and, if the determination is negative, at least one default cell reselection priority indication may be used as a criteria for the cell reselection procedure;

the processing may be implemented in a communication element capable of communicating in a multi-connectivity communication mode, the communication element including at least one of a terminal device or user equipment, wherein the configuration information and the at least one cell reselection priority indication may be received from a communication network control element or function configured to act as a base station or evolved node B of the communication network.

In addition, according to embodiments, there is provided, for example, a computer program product for a computer, including software code portions for performing the steps of the above defined methods, when said product is run on the computer. The computer program product may include a computer-readable medium on which said software code portions are stored. Furthermore, the computer program product may be directly loadable into the internal memory of the computer and/or transmittable via a network by means of at least one of upload, download and push procedures.

BRIEF DESCRIPTION OF THE DRAWINGS

Some embodiments of the present invention are described below, by way of example only, with reference to the accompanying drawings, in which.

DESCRIPTION OF EMBODIMENTS

Figure 1:
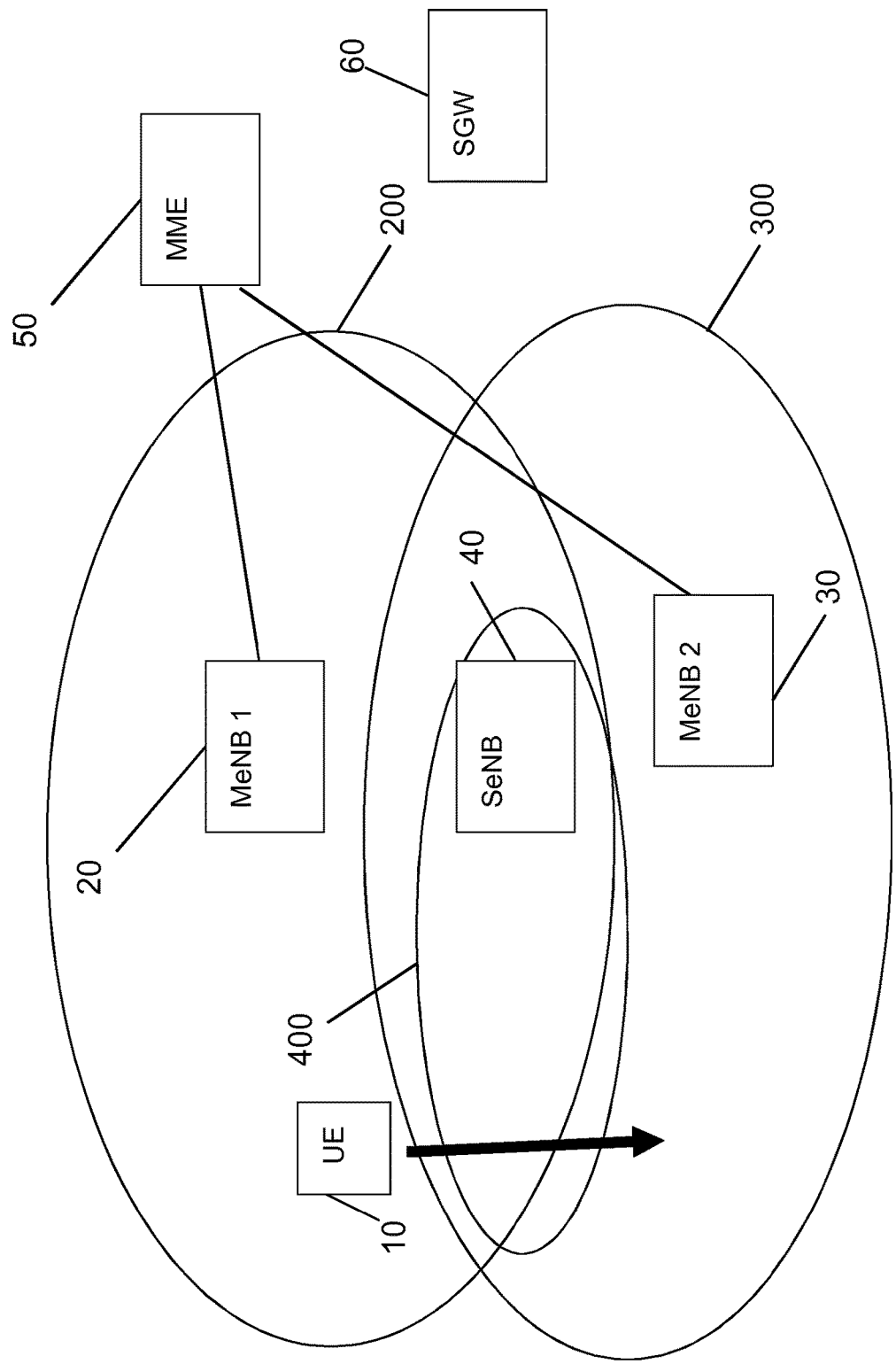
FIG. 1 shows a diagram illustrating an architecture of a communication system where some examples of embodiments are implementable.

In the last years, an increasing extension of communication networks, e.g. of wire based communication networks, such as the Integrated Services Digital Network (ISDN), DSL, or wireless communication networks, such as the cdma2000 (code division multiple access) system, cellular 3rd generation (3G) like the Universal Mobile Telecommunications System (UMTS), fourth generation (4G) communication networks or enhanced communication networks based e.g. on LTE or LTE-A, fifth generation (5G) communication networks, cellular 2nd generation (2G) communication networks like the Global System for Mobile communications (GSM), the General Packet Radio System (GPRS), the Enhanced Data Rates for Global Evolution (EDGE), or other wireless communication system, such as the Wireless Local Area Network (WLAN), Bluetooth or Worldwide Interoperability for Microwave Access (WiMAX), took place all over the world. Various organizations, such as the 3rd Generation Partnership Project (3GPP), Telecoms & Internet converged Services & Protocols for Advanced Networks (TISPAN), the International Telecommunication Union (ITU), 3rd Generation Partnership Project 2 (3GPP2), Internet Engineering Task Force (IETF), the IEEE (Institute of Electrical and Electronics Engineers), the WiMAX Forum and the like are working on standards or specifications for telecommunication network and access environments.

Embodiments as well as principles described below are applicable in connection with any communication element or terminal device, network element, relay node, server, node, corresponding component, and/or to any communication system or any combination of different communication systems that support required functionalities. The communication systems may be any one or any combination of a fixed communication system, a wireless communication system or a communication system utilizing both fixed networks and wireless networks. The protocols used, the specifications of communication systems, apparatuses, such as nodes, servers and user terminals, especially in wireless communication, develop rapidly. Such development may require extra changes to an embodiment. Therefore, all words and expressions should be interpreted broadly and they are intended to illustrate, not to restrict, embodiments.

In the following, different exemplifying embodiments will be described using, as an example of a network architecture to which the embodiments may be applied, a radio access architecture based on 3GPP standards, such as a third generation (3G) or fourth generation (like LTE or LTE-A) communication network, without restricting the embodiments to such architectures, however. It is obvious for a person skilled in the art that the embodiments may also be applied to other kinds of communications networks having suitable means by adjusting parameters and procedures appropriately, e.g. WiFi, worldwide interoperability for microwave access (WiMAX), Bluetooth®, personal communications services (PCS), ZigBee®, wideband code division multiple access (WCDMA), systems using ultra-wideband (UWB) technology, sensor networks, and mobile ad-hoc networks (MANETs).

The following examples and embodiments are to be understood only as illustrative examples. Although the specification may refer to "an", "one", or "some" example(s) or embodiment(s) in several locations, this does not necessarily mean that each such reference is related to the same example(s) or embodiment(s), or that the feature only applies to a single example or embodiment. Single features of different embodiments may also be combined to provide other embodiments. Furthermore, terms like "comprising" and "including" should be understood as not limiting the described embodiments to consist of only those features that have been mentioned; such examples and embodiments may also contain features, structures, units, modules etc. that have not been specifically mentioned.

A basic system architecture of a communication system where some examples of embodiments are applicable may include an architecture of communication networks including a wired or wireless access network subsystem and a core network. Such an architecture may include one or more core network elements, communication network control elements, access network elements, radio access network elements, access service network gateways or base transceiver stations, such as a base station (BS), an access point (AP), a Node B, an RNC or an eNB, which control a respective coverage area or cell(s) and with which one or more communication elements, user devices or terminal devices, such as a UE, or another device having a similar function, such as a modem chipset, a chip, a module etc., which can also be part of an element, function or application capable of conducting a communication, such as a UE, an element or function usable in a machine-to-machine communication architecture, or attached as a separate element to such an element, function or application capable of conducting a communication, or the like, are capable to communicate via one or more channels for transmitting several types of data. Furthermore, core network elements such as mobility management entities, gateway network elements, policy and charging control network elements and functions are included.

The general functions and interconnections of the described elements, which also depend on the actual network type, are known to those skilled in the art and described in corresponding specifications, so that a detailed description thereof is omitted herein. However, it is to be noted that several additional network elements and signaling links may be employed for controlling a communication to or from an element, function or application, like a communication element, such as a UE, a communication network control element, such as an server, and other elements of the same or other communication networks besides those described in detail herein below.

A communication network as described in examples of embodiments may also be able to communicate with other networks, such as a public switched telephone network or the Internet. The communication network may also be able to support the usage of cloud services. It should be appreciated that network elements of an access system, of a core network etc., and/or respective functionalities may be implemented by using any node, host, server, access node or entity etc. being suitable for such a usage.

Furthermore, the described network elements, such as communication elements, like a UE, access network elements, communication network control elements, like a base station, an eNB etc. core network elements like a mobility management entity or a gateway, as well as corresponding functions as described herein, and other elements, functions or applications may be implemented by software, e.g. by a computer program product for a computer, and/or by hardware. For executing their respective functions, correspondingly used devices, nodes or network elements may include several means, modules, units, components, etc. (not shown) which are required for control, processing and/or communication/signaling functionality. Such means, modules, units and components may include, for example, one or more processors or processor units including one or more processing portions for executing instructions and/or programs and/or for processing data, storage or memory units or means for storing instructions, programs and/or data, for serving as a work area of the processor or processing portion and the like (e.g. ROM, RAM, EEPROM, and the like), input or interface means for inputting data and instructions by software (e.g. floppy disc, CD-ROM, EEPROM, and the like), a user interface for providing monitor and manipulation possibilities to a user (e.g. a screen, a keyboard and the like), other interface or means for establishing links and/or connections under the control of the processor unit or portion (e.g. wired and wireless interface means, radio interface means including e.g. an antenna unit or the like, means for forming a radio communication part etc.) and the like, wherein respective means forming an interface, such as a radio communication part, can be also located on a remote site (e.g. a radio head or a radio station etc.). It is to be noted that in the present specification processing portions should not be only considered to represent physical portions of one or more processors, but may also be considered as a logical division of the referred processing tasks performed by one or more processors.

It should be appreciated that according to some examples, a so-called "liquid" or flexible network concept may be employed where the operations and functionalities of a communication network control element, network function, or of another entity of the communication network, may be performed in different entities or functions, such as in a node, host or server, in a flexible manner. In other words, a "division of labor" between involved network elements, functions or entities may vary case by case.

In mobile communication networks, it is usual that a communication element like an UE changes or switches the access point to the network, e.g. due to movement of the UE, due to load conditions or connection quality, etc. When being in communication, e.g. in a connected state, such a change or switch is referred to as handover, and when being in an idle state (e.g. only listening to network signaling but not actively communicating), a corresponding procedure is also referred to as cell reselection.

Cell Reselection is a mechanism for switching or changing a cell after a UE is camped on a cell and is in idle mode. The UE will be connected to a cell which has the best condition among all the cells to which the UE is allowed to camp on. For changing cells, the UE uses a set of criteria (typically influenced by the serving cell via broadcast information) and algorithms for conducting the reselection process. For example, the set of criteria may comprise an absolute priority, a radio link quality, cell accessibility etc.

When the UE is first turned on, it first searches for a network, for example via a mechanism like one being called PLMN selection. Once the UE determines it has found a PLMN, it attempts to find a suitable serving cell, for example, via a Cell Selection process. Once that is successful, the UE attempts to do a registration at the cell it has selected. After the registration, the UE may then keep measuring received power and signal quality for the cell it registered (also in an idle state). Here, cell reselection procedure is performed based on the reselection criteria. For example, in case the power or quality is not sufficient anymore, another cell is searched and selected to be camped on.

In view of the fact that in mobile networks the communication elements are moving around, which may require a frequent updating with the network for the current position, in order to decrease a corresponding signaling load, concepts like tracking area are used. Tracking are is a concept of an area where a UE can move around without updating the core network, such as an MME. For this purpose, the network allocates a list with one or more TAs to the user. In certain operation modes, the UE may move freely in all TAs of the list without updating the MME.

Paging requests are transmitted by all cells of a tracking area, i.e. a tracking area may be a set of cells. Tracking areas can be grouped into lists of tracking areas (TA lists), which are configured on the UE. Herein, TA and TA list may be used synonymously, if not stated otherwise or clear from the context. I.e., a TA list may comprise only one TA or more than one TA.

Each base station or eNB (i.e. a network element like a base station etc. which is able to serve the UE for providing network access) broadcasts a special tracking area code (TAC) to indicate to which TA the cell (i.e. the eNB or the like) belongs. The TAC is unique within a PLMN. Since PLMN is a unique number allocated to each of the system operator and TAC is a unique in a PLMN, it is possible to combine these two numbers for getting a globally unique number. This number (PLMN+TAC) is called tracking area identity (TAI). For example, the UE may store a group of TAC and this group of TAC maintained in a UE is the TA list. In case the UE moves along cells of the TA list, it is not necessary to go through a tracking area update (TAU) procedure.

Tracking area updates may be performed periodically or when the UE moves to a tracking area that is not included in its TA list. MME assigns the TA (or TA-list) to UE as part of the ATTACH procedure (i.e. when first registering on the network, e.g. upon the first power-on) or tracking area update procedure. The TA (or TA-list) to be assigned to UE is based on the current serving cell of the UE. TAU is performed, for example, in RRC connected mode. TAU may also be performed in idle mode periodically and when UE reselects a new cell whose TA is different from the currently stored TA. In this case, UE may be first required to change its RRC state to connected state before being able to send the TAU to the MME.

In order to handle the ongoing growth of communication demands and data traffic, operators of communication networks are employing different measures. One example is the employment of so called small cells. Small cells are, for example, low-powered radio access nodes that operate in licensed and unlicensed spectrum and have a smaller range compared to so-called macro cells. Small cells can be used, for example for mobile data offloading by using available radio spectrum more efficiently.

However, it has been found that small cell enhancements may lead, from higher layer aspects, to additional challenges, in particular when a macro cell and small cells are connected via non-ideal backhaul. These challenges comprise mobility robustness, throughput enhancements and increased signaling load due to frequent handover.

To address these challenges, a so-called dual-connectivity approach is considered. Dual connectivity is an operation where a given UE consumes radio resources provided by at least two different network points (also referred to as master and secondary nodes, such as MeNB and SeNB) which are connected with non-ideal backhaul while in RRC_CONNECTED state. When the UE is simultaneously connected to MeNB and SeNB, throughput and mobility robustness gains can be achieved. As a baseline assumption for control plane architecture for dual-connectivity, single RRC between MeNB and UE has been agreed.

For example, in dual connectivity, a UE is simultaneously connected with an MeNB and an SeNB, wherein control plane (RRC) for both MeNB and SeNB will be located in MeNB. The RRC control plane for the UE is located in MeNB and not in SeNB. In particular, MeNB acts as mobility anchor towards the core network. MeNB is changed only at handover, while SeNB may be added or released depending on the needs as determined by MeNB (e.g. by means of an addition procedure). For example, the SeNB provides additional radio resources to the UE.

MeNB is sometimes used synonymously with PCell, and SeNB is sometimes used synonymously with PSCell, if not otherwise indicated or made clear from the context. The group of the serving cells associated with the MeNB is named MCG, and the group of the serving cells associated with the SeNB is named SCG. MCG contains at least the PCell and may contain one or more SCells. SCG contains at least the PSCell and may contain one or more SCells.

FIG. 1 shows a diagram illustrating a general architecture of a communication system where dual-connectivity mode is usable so that examples of embodiments of the invention are implementable. It is to be noted that the structure indicated in FIG. 1 shows only those devices, network elements and links which are useful for understanding principles underlying the examples and embodiments of the invention. As also known by those skilled in the art there may be several other network elements or devices involved in a communication in the communication system which are omitted here for the sake of simplicity.

In FIG. 1, a network is shown which form a general basis for an example of a communication system according to some examples of embodiments. Specifically, a (wireless) communication network based for example on a 3GPP specification is depicted where a cellular structure with a plurality of communication areas or cells provide a coverage area in which a communication element, such as a UE, can communicate. It is to be noted that both the number of cells as well as the type thereof as depicted in FIG. 1 are merely intended to provide a basis for illustrating the principles of the control processing according to some examples of embodiments, while each one of the number and type of the involved cells may be different to those shown in FIG. 1. The cells shown in FIG. 1 may have different sizes, such as so-called macro cells and small cells (pico cells, femto cells etc.) forming a so-called heterogeneous network.

According to FIG. 1, reference sign 10 denotes a communication element, such as a UE, of a subscriber which represents one terminal point of a communication, i.e. from which UL data packets are transmitted and to which DL data packets are sent. According to examples of embodiments, the UE 10 is capable to performing a communication in a dual-connectivity mode. As such UE 10 is also referred to as a DC UE. An arrow indicated in FIG. 1 illustrates a possible movement of the UE 10 with regard to respective cells.

Reference sign 20 denotes a communication network control element, such as an eNB, which controls a cell 200 in which the UE 10 can communicate. In the example shown in FIG. 1, it is assumed that the eNB 20 acts as a master node for a communication of the UE 10 in a dual-connectivity mode, wherein the cell 200 is e.g. a so-called macro cell. That is, the eNB 20 is connected to the UE 10 by means of an air interface or the like. Furthermore, the eNB 20 is connected to a core network (described later).

Reference sign 30 denotes a further communication network control element, such as an eNB, which controls a cell 300 in which the UE 10 can communicate. In the example shown in FIG. 1, it is assumed that the cell 300 is also a macro cell, wherein the eNB 30 is an access node which can be contacted by the UE 10 for cell reselection. That is, the eNB 30 is connectable to the UE 10 by means of an air interface or the like. Furthermore, the eNB 30 is connected to a core network (described later).

Reference sign 40 denotes a communication network control element, such as an eNB, which controls a cell 400 in which the UE 10 can communicate. In the example shown in FIG. 1, it is assumed that the eNB 40 acts as a secondary node for a communication of the UE 10 in a dual-connectivity mode (i.e. SeNB). For example, the eNB 40 controls a so-called small cell. That is, the SeNB 40 is connected to the UE 10 by means of an air interface or the like. Furthermore, the SeNB 40 may have user plane connection with a core network depending on the data bearer type supported in SeNB (not shown).

Even though it is not shown in FIG. 1, the respective eNBs 20, 30 and 40 may be connected to each other by means of a suitable interface. For example a so-called X2 interface is used in LTE-based networks.

Reference sign 50 denotes a core network element, such as a MME, which deals with the control plane and handles signalling related to mobility and security for E-UTRAN access. The MME is responsible, for example, for tracking and paging of a UE in idle mode. In the example shown in FIG. 1, the MME 50 is connected to the MeNBs for controlling communication of the UE 10 in a dual-connectivity mode.

Reference sign 60 denotes a core network element, such as a gateway node like an SGW, which serves a UE by routing the incoming and outgoing IP packets. In the example shown in FIG. 1, the SGW 60 is connected to the eNBs for this purpose (not shown).

As indicated above, dual connectivity is a mode of operation of a UE in RRC_CONNECTED state, configured with a Master Cell Group (MCG) and a Secondary Cell Group (SCG). For example, the MeNB 20 exchanges control information with the core network, e.g. the MME 50, via a corresponding interface (e.g. S1-MME interface) and with SeNB 40 via an X2-C interface. SeNB 40 and MME 50 do not exchange directly control information for a terminal in dual connectivity.

For example, in dual connectivity, there are three types of bearer:

- For MCG bearers, the MeNB 20 is U-plane connected to a gateway, e.g. SGW 60, via S1-U interface, while the SeNB 40 is not involved in the transport of user plane data.
- For split bearers, the MeNB 20 is U-plane connected to the SGW 60 via S1-U interface and in addition, the MeNB 20 and the SeNB 40 are interconnected via X2-U interface.
- For SCG bearers, the SeNB 40 is directly connected with the SGW 60 via S1-U interface.

In a network as depicted in FIG. 1, i.e. where small cells exist in the neighborhood of macro cells, it is for example preferable to let a UE select first a cell belonging to the small-cell layer (e.g. cell 400), i.e. to allow a UE to access the small cell whenever it is detected. Correspondingly, for setting such a cell reselection criteria, a cell reselection priority for small cells is broadcasted or signaled by dedicated priority assignment.

However, when the UE in question is communicating in dual connectivity mode, such a preference for small cells may be not optimal. For example, when a DC UE is camping always on SeNB, there may be caused additional load, as discussed in the following.

Assuming a deployment where macro-cells, such as cells 200 and 300 in FIG. 1, provide a coverage layer (a continuous coverage) and small cells (like cell 400) provide capacity enhancements, wherein cell reselection priority configurations sent from macro cells, e.g. via system information (SIB) or by using a dedicated signaling, indicate that a higher priority is assigned to small cell layer, the result is that the UE reselects the small cell 400 whenever it is detected. That is, the DC UE 10 also will camp onto small cells whenever it is detected. Consequently, when a RRC connection starts, the UE 10 first connects to the small cell 400 (i.e. SeNB 40 controlling the small-cell). In view of the dual-connectivity mode, the SeNB 40 conducts a handover to the MeNB (e.g. MeNB 20), which will then reconfigure the UE 10 with dual connectivity.

In summary, when implementing a cell reselection priority for small cells, a DC UE may experience additional signaling and handover for moving from idle mode to dual-connectivity mode. Thus, a significant signaling and processing load is resulting from the handover and reconfiguration.

On the other hand, an idle-mode to connected-mode transition via the MeNB 20, for example, followed by an SeNB addition procedure to move to dual-connectivity configuration requires less signaling and is thus more efficient in terms of signaling transactions. Furthermore, a UE data interruption window is smaller.

Consequently, in particular in case of dual connectivity scenarios, it is to be considered to set a DC UE in such a manner that a macro-cell layer is given a high priority. In this case, the UE under macro-cell coverage first sets up the RRC connection via MeNB (e.g. MeNB 20), followed by SeNB addition procedure. Due to this, handover signaling is avoided, and only SCG addition procedure is conducted. As the SeNB addition happens along with bearer setup itself, there is no data interruption involved in this procedure.

However, as indicated above, for usual UEs (i.e. non-dual-connectivity enabled UEs), it may be preferred to set high priority of small cells, so that system information being broadcasted by the eNBs, for example, indicates higher cell reselection priority for small-cell layers. In such case, it is possible to assign a higher cell-reselection priority for macro-cell layer to DC UEs, for example, by means of dedicated signaling. In other words, a dedicated cell reselection priority indication for macro cells can be assigned for DC UE.

However, such a dedicated priority may be over-written when the UE reselects to a new cell. Thus, using dedicated priority to ensure that the DC UE stay on macro layer has limited benefit as this value is not applicable across cell changes.

It is conceivable that cells under macro and small cell layers have different tracking areas. In this case, an eNB can assign new dedicated priorities upon receiving a TAU from UE. However, usually dedicated priorities expire after a specific time (e.g. 3 hours), and it is also to be noted that TA configurations may be complicated.

It is also conceivable to use cell-specific reselection priorities. For example, cell specific prioritization increases the likelihood of a UE to be associated with a small cell when it is time to connect. For example, in the system information, a separate (typically higher) priority value is provided which applies to specific cells on the particular frequency in addition to the existing cell reselection priority associated with the frequency. The UE should then perform inter-frequency measurements in idle mode on this frequency, assuming the maximum cell reselection priority (regular or cell specific). When the highest ranked cell on this frequency is one of the specific cells, cell reselection priority is applied according to the separate priority associated with those; otherwise, the regular (legacy) cell reselection priority is applied.

According to examples of embodiments of the invention, in order to suitably configure a DC UE, such as UE 10, for conducting a cell reselection procedure in which excessive signaling due to handover can be avoided, a dedicated cell reselection priority configuration is sent to UE from MeNB, accompanied by additional configuration information indicating an (idle-mode) preservation scope for the given configuration. Following the preservation scope, the UE maintains the information like the other information provided by the dedicated cell reselection priorities, i.e. the UE maintains the received cell reselection priority in idle mode across all cells indicated in the preservation scope. That is, an additional preservation scope for dedicated priorities is provided to DC UEs, by means of which a cell reselection behavior can be implemented by the UE when being in cells inside the scope which is different to a cell reselection behavior when being in cells outside the scope.

It is to be noted that according to some examples of embodiments the preservation scope for the dedicated priority is provided, for example, from the core network, e.g. the MME 50, wherein a corresponding preservation scope indication can be an AS or NAS message. For example, RRC configuration signaling is used. Alternatively or additionally, the MME provides the preservation scope indication as part of an S1 message related to e.g. UE context modification request or in a downlink NAS transport.

Furthermore, according to examples of embodiments, the preservation scope given to the UE has different contents. For example, a tracking area can be indicated. Alternatively, for example, an EARCFN and/or a range of cell identifiers (one or more cell identifiers) are indicated.

It is to be noted that according to some examples of embodiments, it is also possible that for the respective cells being under preservation scope (i.e. indicated in the preservation scope indication, for example), the validity of the dedicated reselection priorities are handled separately. This is achieved, for example, by adding an additional timer to the configuration information that specifies how long the corresponding rules are valid. For example, the timer is related to a processing in a communication network control element, e.g. for indicating how long or in which time frame a dedicated cell reselection priority is to be forwarded to a UE in question. Alternatively or additionally, the timer is related to a processing in the communication element (i.e. the UE) defining for example, how long, after implementing the configuration information, the dedicated cell reselection priority is valid.

It is to be further noted that according to some examples of embodiments a UE is configured with at least one preservation scope, i.e. more than one preservation scope can be assigned.

Figure 2:
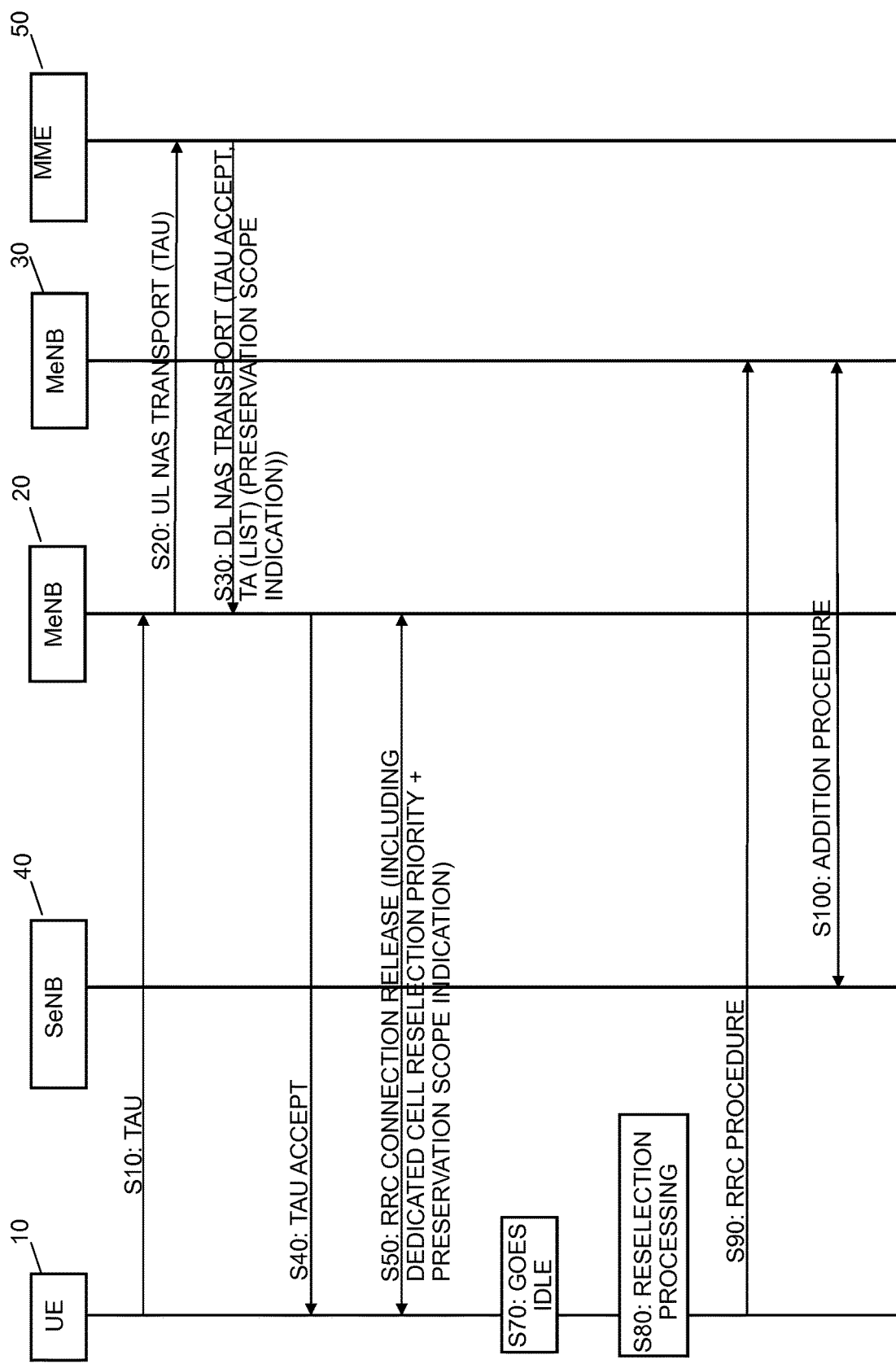
FIG. 2 shows a signaling diagram illustrating a signal exchange according to some examples of embodiments.

FIG. 2 shows a signaling diagram illustrating a procedure for configuring a cell reselection procedure using the above described mechanism including a preservation scope indication to be provided to the UE. For illustrative purposes, on the basis of a network as depicted in FIG. 1, signaling between the UE 10, the MeNB 20, the MeNB 30, the MME 50 and the MeNB 30, wherein it is also assumed that the UE 10 moves along the arrow shown in FIG. 1 when being in an idle state. Furthermore, it is assumed that an operator configures separate tracking areas for macro-cells and small-cells to avoid the paging load towards small-cells.

In S10, the UE 10 sends a TAU to the network, e.g. to MeNB 20 to which is it connected.

The MeNB 20 forwards in S20 the TAU, for example by an UL NAS transport signaling, the the MME 50.

When the MME 50 receives the tracking area update message from the DC UE 10, the MME 50 indicates the preservation scope for a dedicated priority, for example, as a TA to the MeNB 20, by sending a DL NAS transport signaling in S30. The signaling in S30 comprises also other information, such as a TAU accept.

It is to be noted that according to some examples of embodiments, the preservation scope indication can be send also by other signaling mechanisms, as indicated, such as AS signaling, etc.

In S40, the TAU accept is forwarded by the MeNB 20 to the UE 10.

In S50, a RRC connection release procedure is executed between the UE 10 and the MeNB 20, e.g. for entering the idle state. In the RRC connection release, for example, an RRC connection release message is sent from the MeNB 20, which includes a dedicated cell reselection priority indication to the UE 10 entering the idle state in order to favor the macro-cell layer, wherein dedicated cell reselection priority indication is accompanied by the preservation scope as indicated from the MME 50.

It is to be noted that the dedicated cell reselection priority and the preservation scope indication can also be transmitted to the UE 10 in separated manner from a RRC connection release signaling, e.g. in a preceding state, i.e. before S50 (not shown in FIG. 2). Furthermore, according to some examples of embodiments, instead of an RRC signaling, it is also possible that configuration information including the dedicated cell reselection priority indication and the preservation scope indication is provided to the UE 10 by other signaling mechanism, e.g. by an AS signaling, NAS signaling, and the like.

On release of RRC connection in S70, i.e. when the UE 10 enters the idle state, the UE 10 conducts a cell reselection procedure in S80, including for example measurements and decisions regarding changing the cell. In this context, the UE 10 refers to the received cell reselection priority configuration. The preservation scope indication ensures that the cell reselection priority configuration is also considered after a cell-reselection, provided the new cell is also under the same tracking area (i.e. preservation scope).

That is, when the UE 10 is moving along the arrow indicated in FIG. 1, it will come into the coverage area of the cell 400 controlled by the SeNB 40. In the cell reselection procedure conducted according to the configuration information and the dedicated cell reselection priority indication received in S60, as per the dedicated priority, macro-cell layer have higher priority and MeNB is part of preservation scope, the UE 10 does not reselect cell 400 which belongs to layer with lower priority. Instead, following the dedicated cell reselection priority indication assigning priority to the macro-cell layer, cell reselection to the cell 300 is decided to be conducted. For this purpose, in S90, a RRC connection procedure is started to the MeNB 30, which is followed in S100 by an addition procedure for adding SeNB 40 for dual-connectivity communication.

That is, when no preservation scope being involved, a cell reselection priority is considered which assigns priority, for example, to different EARFCNs. In case an ERAFCN is assigned with higher priority, the UE 10 conducts a search for cells in this layer even if a currently served cell is strong periodically. Otherwise, the UE conducts a search only when the serving cell degrades below specific threshold.

On the other hand, according to examples of embodiments, when the preservation scope is considered, the following processing applies. In case the UE 10 is currently served by a cell which is part of the preservation scope indication, then the UE 10 uses the priority indication which is assigned from the signaling which includes the preservation scope indication, e.g. the dedicated signaling, for searching different frequencies. When the search is triggered, the selection follows the reselection criteria (i.e. the preservation scope is not used).

Consequently, with the above described procedure according to some examples of embodiments, the dual connectivity UE 10 always prefer to stay on the macro-cell layer. Even in the proximity of small-cells, the DC UE stay in macro-cells, while the small-cell is added as PScell, i.e. as part of RRC connection setup and reconfiguration procedure.

In the above described example, the parameter for the preservation scope is described to be the TA. However, according to further examples of embodiments, also other parameters can be used. For example, in scenario where the same tracking area is assigned for macro and small cells, it is possible to include the EARFCN list of macro layer as preservation scope. Alternatively, also cell identifiers, such as an ECGI/PCI range, can be used as preservation scope for the dedicated cell reselection priority.

It is to be noted that even though in the above described examples of embodiments a dual-connectivity mode is described, embodiments of the invention are not limited to such a communication mode. For example, connectivity to more than two network nodes may be established, i.e. a multi-connectivity mode may be implemented.

Figure 3:
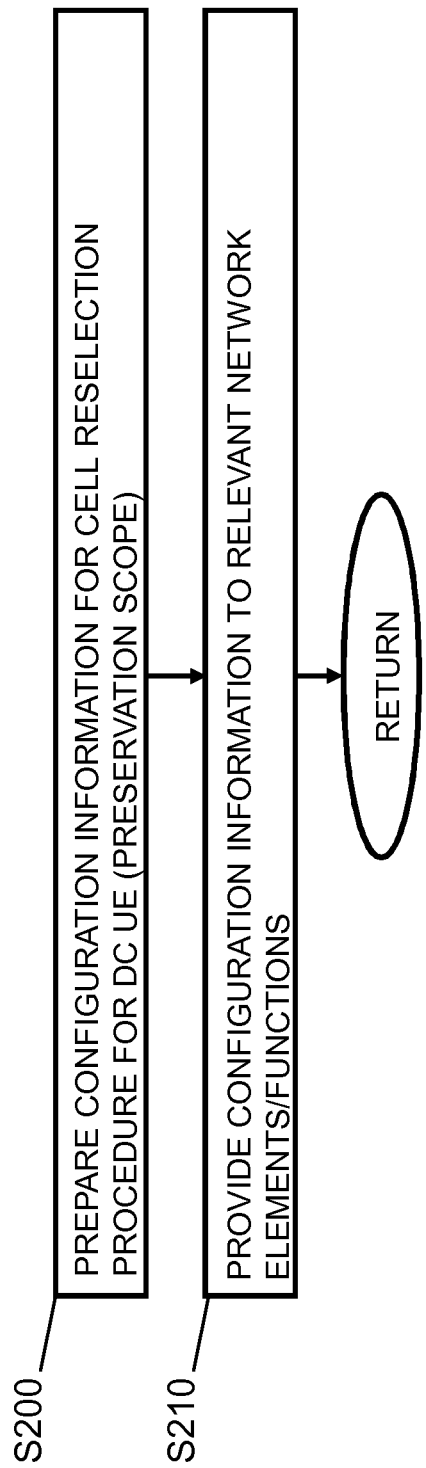
FIG. 3 shows a flow chart of a processing conducted in a core network element or function according to some examples of embodiments.

FIG. 3 shows a flow chart of a processing conducted in a network element acting as a core network element for providing configuration information related to the cell reselection procedure according to some examples of embodiments. Specifically, the example according to FIG. 3 is related to a processing conducted by a core network element, function or node acting as a MME 50 in the communication network system as depicted e.g. in FIG. 1, wherein the cell reselection procedure is related to a communication element or UE capable of multi-connectivity (e.g. DC) communication.

In S200, configuration information regarding cell reselection in a communication network for at least one communication element capable of communicating in a multi-connectivity communication mode, like UE 10, is prepared. According to examples of embodiments, the configuration information comprises at least one preservation scope indication related to at least one cell reselection priority indication which indicates that priority is to be assigned to a first type of cells of the communication network for cell reselection, compared to other types of cells of the communication network. According to examples of embodiments, the at least one preservation scope indication indicates at least one cell across which the at least one cell reselection priority indication is to be maintained.

According to some examples of embodiments, the configuration information is related to a configuration of the at least one UE capable of communicating in the multi-connectivity communication mode in an idle state. For example, the at least one cell reselection priority indication is to be signaled by means of a dedicated cell reselection priority configuration signaling.

Furthermore, according to some examples of embodiments, the at least one preservation scope indication includes, for indicating the at least one cell across which the at least one cell reselection priority indication is to be maintained, at least one of a TA, an absolute radio frequency channel number (e.g. EARFCN) and a channel identifier or range or channel identifiers.

According to some examples of embodiments, the configuration information further comprises timer information indicating a time during which the at least one preservation scope indication or the at least one cell reselection priority indication is valid.

In S210, the configuration information is provided to relevant network elements or function for configuring the at least one communication element capable of communicating in the multi-connectivity communication mode.

According to some examples of embodiments, the configuration information is provided by one of an access stratum signaling, a non-access stratum signaling, a radio resource control configuration signaling, and a signaling via an interface towards an access network element or function.

It is to be noted that according to some examples of embodiments, the first type of cells of the communication network includes cells of a macro-cell layer of a heterogeneous network structure of the communication network, i.e. macro cells 200 and 300 of FIG. 1, for example.

Figure 4:
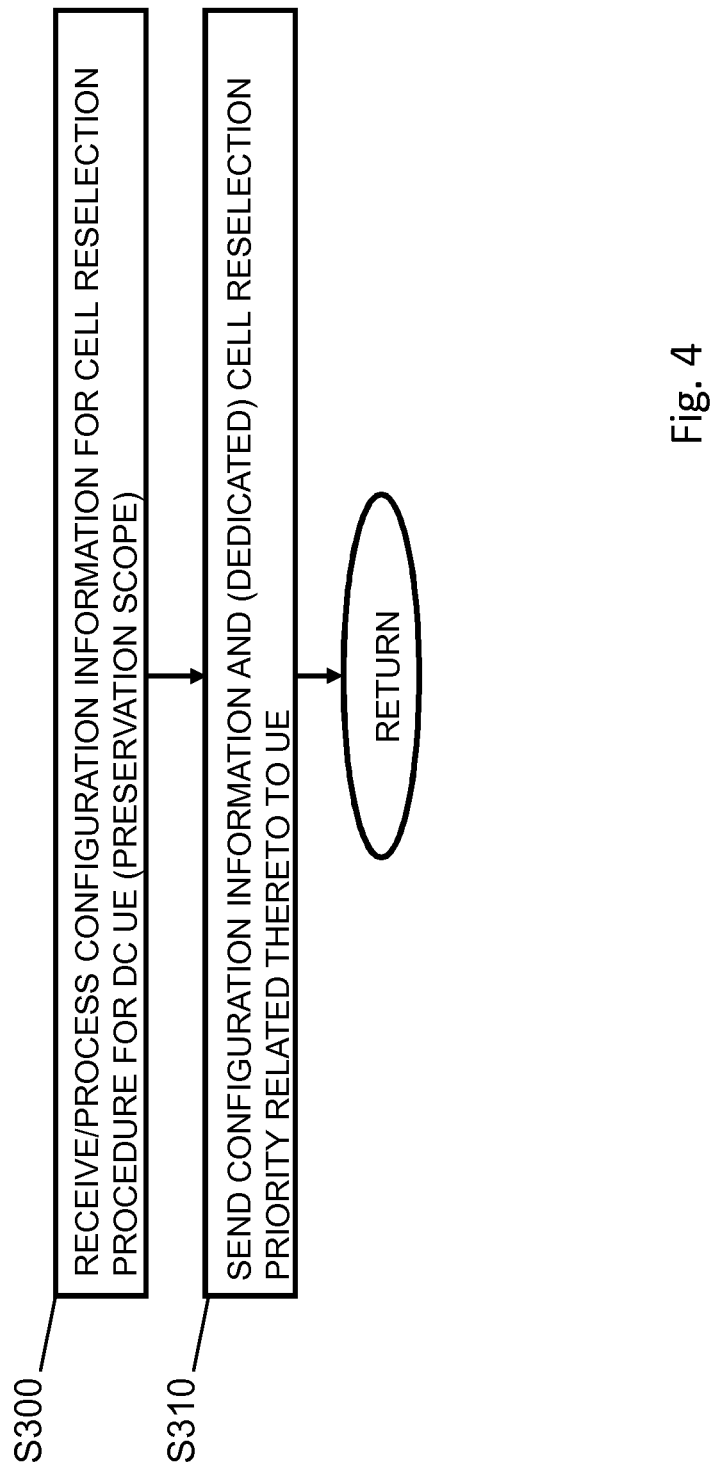
FIG. 4 shows a flow chart of a processing conducted in a communication network control element or function according to some examples of embodiments.

FIG. 4 shows a flow chart of a processing conducted in a network element acting as a communication network control element for controlling a configuration related to the cell reselection procedure according to some examples of embodiments. Specifically, the example according to FIG. 4 is related to a processing conducted by a communication network control element, function or node acting as a master eNB, such as MeNB 20, in the communication network system as depicted e.g. in FIG. 1, wherein the cell reselection procedure is related to a communication element or UE capable of multi-connectivity (e.g. DC) communication.

In S300, configuration information regarding cell reselection in a communication network for at least one communication element capable of communicating in a multi-connectivity communication mode is received and processed. The configuration information comprises at least one preservation scope indication related to at least one cell reselection priority indication which indicates that priority is to be assigned to a first type of cells of the communication network for cell reselection, compared to other types of cells of the communication network. According to examples of embodiments, the at least one preservation scope indication indicates at least one cell across which the at least one cell reselection priority indication is to be maintained.

According to some examples of embodiments, the configuration information is related to a configuration of the at least one communication element capable of communicating in the multi-connectivity communication mode in an idle state. The at least one cell reselection priority indication is signaled, for example, by means of a dedicated cell reselection priority configuration signaling.

Furthermore, according to some examples of embodiments, the at least one preservation scope indication includes, for indicating the at least one cell across which the at least one cell reselection priority indication is to be maintained, at least one of a TA, an absolute radio frequency channel number (such as EARFCN) and a channel identifier or range of channel identifiers.

Moreover, according to some examples of embodiments, the configuration information further comprises timer information indicating a time during which the at least one preservation scope indication or the at least one cell reselection priority indication is valid. Depending on which element the timer information is related (i.e. the UE or the eNB, for example), either an (own) timer is triggered according to the timer information, wherein at an expiry of the timer the configuration information is discarded, or the timer information is forwarded, together with the configuration information, to the at least one communication element.

According to some examples of embodiments, the configuration information is received by one of an access stratum signaling, a non-access stratum signaling, a radio resource control configuration signaling, and a signaling via an interface towards an access network element or function.

In S310, the configuration information including the at least one preservation scope indication is transmitted, together with at least one cell reselection priority indication to which the at least one preservation scope indication is related, to the at least one communication element (e.g. UE 10) capable of communicating in the multi-connectivity communication mode.

According to some examples of embodiments, the configuration information is transmitted together with the at least one cell reselection priority indication to which the at least one preservation scope indication is related, to the at least one communication element capable of communicating in the multi-connectivity communication mode when a transition of a communication state of the UE in question from a connected state (e.g. RRC_CONNECTED) to an idle state is determined.

As indicated above, it is to be noted that according to some examples of embodiments, the first type of cells of the communication network includes cells of a macro-cell layer of a heterogeneous network structure of the communication network, i.e. macro cells 200 and 300 of FIG. 1, for example.

Figure 5:
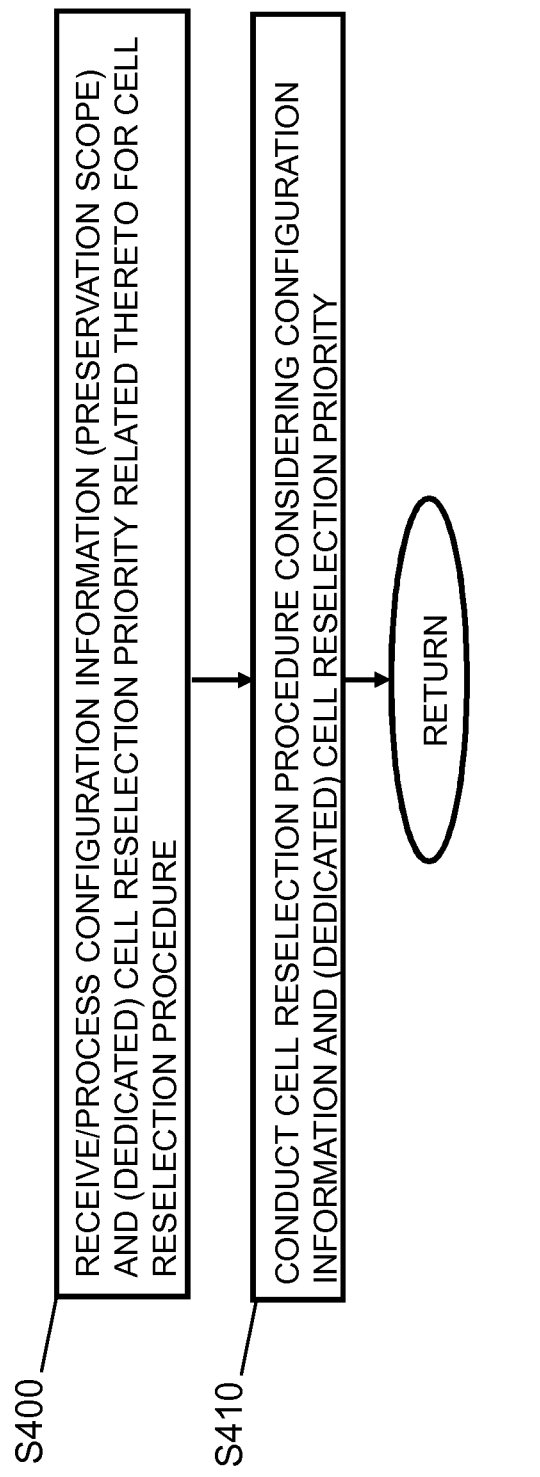
FIG. 5 shows a flow chart of a processing conducted in communication element or function according to some examples of embodiments.

FIG. 5 shows a flow chart of a processing conducted in a network element acting as a communication element conducting the cell reselection procedure according to some examples of embodiments. Specifically, the example according to FIG. 5 is related to a processing conducted by a communication element, function or node acting as an UE, such as UE 20, in the communication network system as depicted e.g. in FIG. 1, wherein the communication element or UE is capable of multi-connectivity (e.g. DC) communication.

In S400, configuration information regarding cell reselection in a communication network together with at least one cell reselection priority indication to which the at least one preservation scope indication is related are received and processed. The at least one cell reselection priority indication indicates that priority is to be assigned to a first type of cells of the communication network for cell reselection, compared to other types of cells of the communication network. The configuration information comprises at least one preservation scope indication related to the at least one cell reselection priority indication, wherein the at least one preservation scope indication indicates at least one cell across which the at least one cell reselection priority indication is to be maintained.

According to some examples of embodiments, the configuration information is related to a configuration for an idle state, wherein the at least one cell reselection priority indication is signaled by means of a dedicated cell reselection priority configuration signaling.

Furthermore, according to some examples of embodiments, the at least one preservation scope indication includes, for indicating the at least one cell across which the at least one cell reselection priority indication is to be maintained, at least one of a TA, an absolute radio frequency channel number (such as an EARFCN) and a channel identifier or a range of channel identifiers.

According to some examples of embodiments, the configuration information further comprises timer information indicating a time during which the at least one preservation scope indication or the at least one cell reselection priority indication is valid. Thus, a timer is triggered according to the timer information, wherein at an expiry of the timer the configuration information is discarded.

Moreover, according to some examples of embodiments, the configuration information is received by at least one of an access stratum signaling, a non-access stratum signaling, and a radio resource control configuration signaling. Furthermore, for forwarding the configuration information (priority indication, preservation scope) to the UE, the configuration information can be sent by one of an access stratum signaling, a non-access stratum signaling, and a radio resource control configuration signaling.

According to some examples of embodiments, the configuration information together with the at least one cell reselection priority indication to which the at least one preservation scope indication is related are received from a communication network control element (e.g. MeNB 20) when a transition of a communication state from a connected state (e.g. RRC_CONNECTED) to an idle state is to be conducted.

In S410, a cell reselection procedure is conducted wherein the configuration information and the at least one cell reselection priority indication are considered correspondingly.

For example, according to some examples of embodiments, when conducting the cell reselection procedure considering the configuration information and the at least one cell reselection priority indication, the indicated at least one cell reselection priority is maintained in the at least one cell indicated in the preservation scope indication (i.e. even if a cell change is conducted, for example).

Furthermore, according to some examples of embodiments, it is determined whether a cell currently being the serving cell is part of the at least one cell indicated in the preservation scope indication. If the determination is positive (i.e. the serving cell is part of the preservation scope indication), the at least one cell reselection priority indication to which the preservation scope indication is related, is used as at least one of criteria for the cell reselection procedure. If the determination is negative (the cell is not part of the preservation scope), default cell reselection priority indication as a criteria for the cell reselection procedure is used.

As indicated above, it is to be noted that according to some examples of embodiments, the first type of cells of the communication network includes cells of a macro-cell layer of a heterogeneous network structure of the communication network, i.e. macro cells 200 and 300 of FIG. 1, for example.

Figure 6:
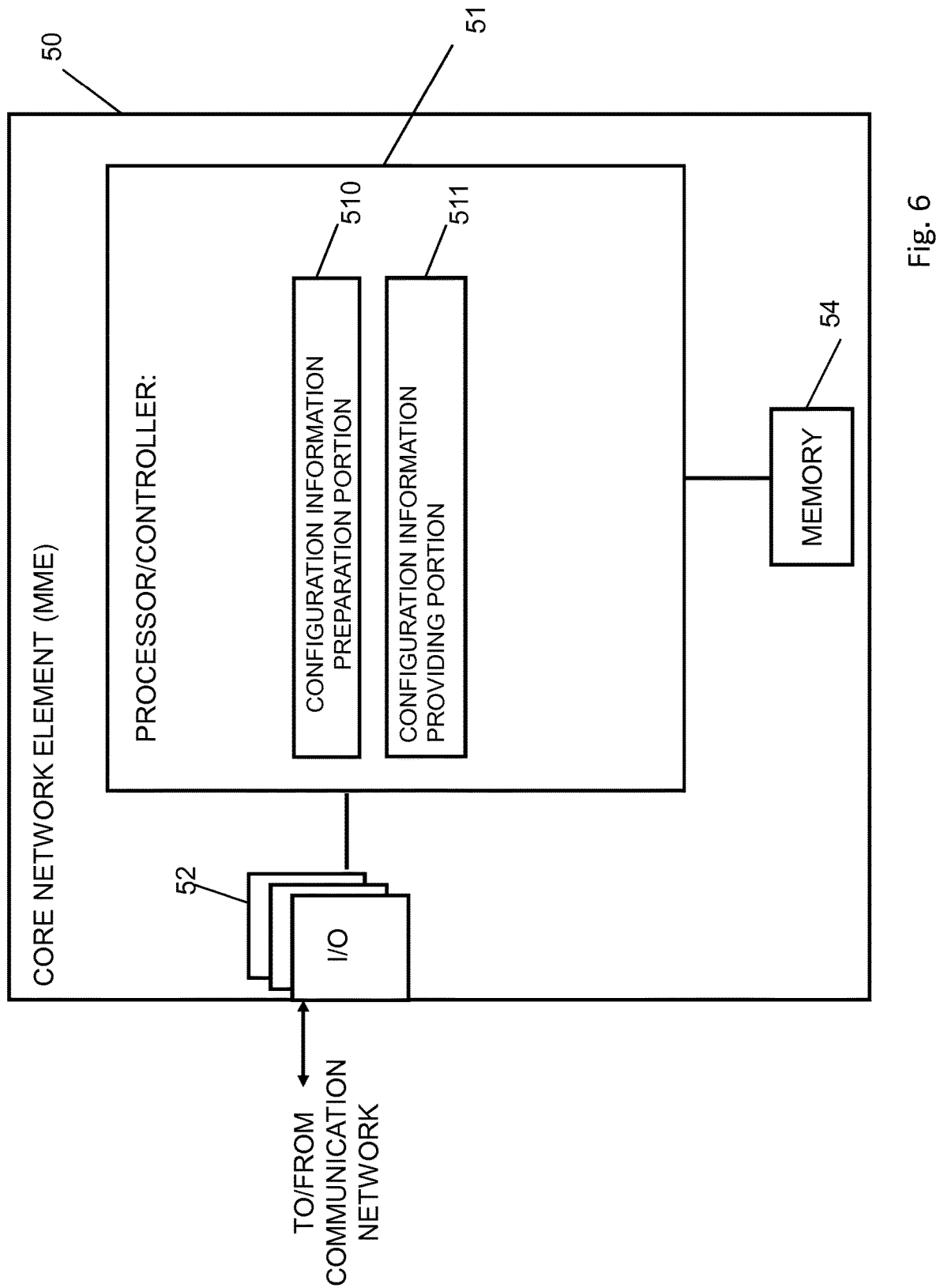
FIG. 6 shows a diagram of a core network element or function according to some examples of embodiments.

FIG. 6 shows a diagram of a core network element according to some examples of embodiments, which is configured to implement a procedure as described in connection with some of the examples of embodiments. It is to be noted that the core network element, like the MME 50, which is shown in FIG. 6, may include further elements or functions besides those described herein below. Furthermore, even though reference is made to a core network element or node, the element or node may be also another device or function having a similar task, such as a chipset, a chip, a module, an application etc., which can also be part of a network element or attached as a separate element to a network element, or the like. It should be understood that each block and any combination thereof may be implemented by various means or their combinations, such as hardware, software, firmware, one or more processors and/or circuitry.

The network element shown in FIG. 6 may include a processing circuitry, a processing function, a control unit or a processor 51, such as a CPU or the like, which is suitable for executing instructions given by programs or the like related to the control procedure. The processor 51 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference sign 52 denotes transceiver or input/output (I/O) units or functions (interfaces) connected to the processor or processing function 51. The I/O units 52 may be used for communicating with other elements of a communication network, such as the communication network as shown in FIG. 1, and in particular with a communication network control element or function as described above, such as the eNB 20. The I/O units 52 may be a combined unit including communication equipment towards several network elements, or may include a distributed structure with a plurality of different interfaces for different network elements. Reference sign 54 denotes a memory usable, for example, for storing data and programs to be executed by the processor or processing function 51 and/or as a working storage of the processor or processing function 51. It is to be noted that the memory 54 may be implemented by using one or more memory portions of the same or different type of memory.

The processor or processing function 51 is configured to execute processing related to the above described procedure. In particular, the processor or processing circuitry or function 51 includes one or more of the following sub-portions. Sub-portion 510 is a processing portion which is usable for preparing configuration information related to cell reselection and including the preservation scope. The portion 510 may be configured to perform processing according to S200 of FIG. 3. Furthermore, the processor or processing circuitry or function 51 may include a sub-portion 511 usable as a portion for providing the configuration information to relevant network elements or functions. The portion 511 may be configured to perform a processing according to S210 of FIG. 3.

Figure 7:
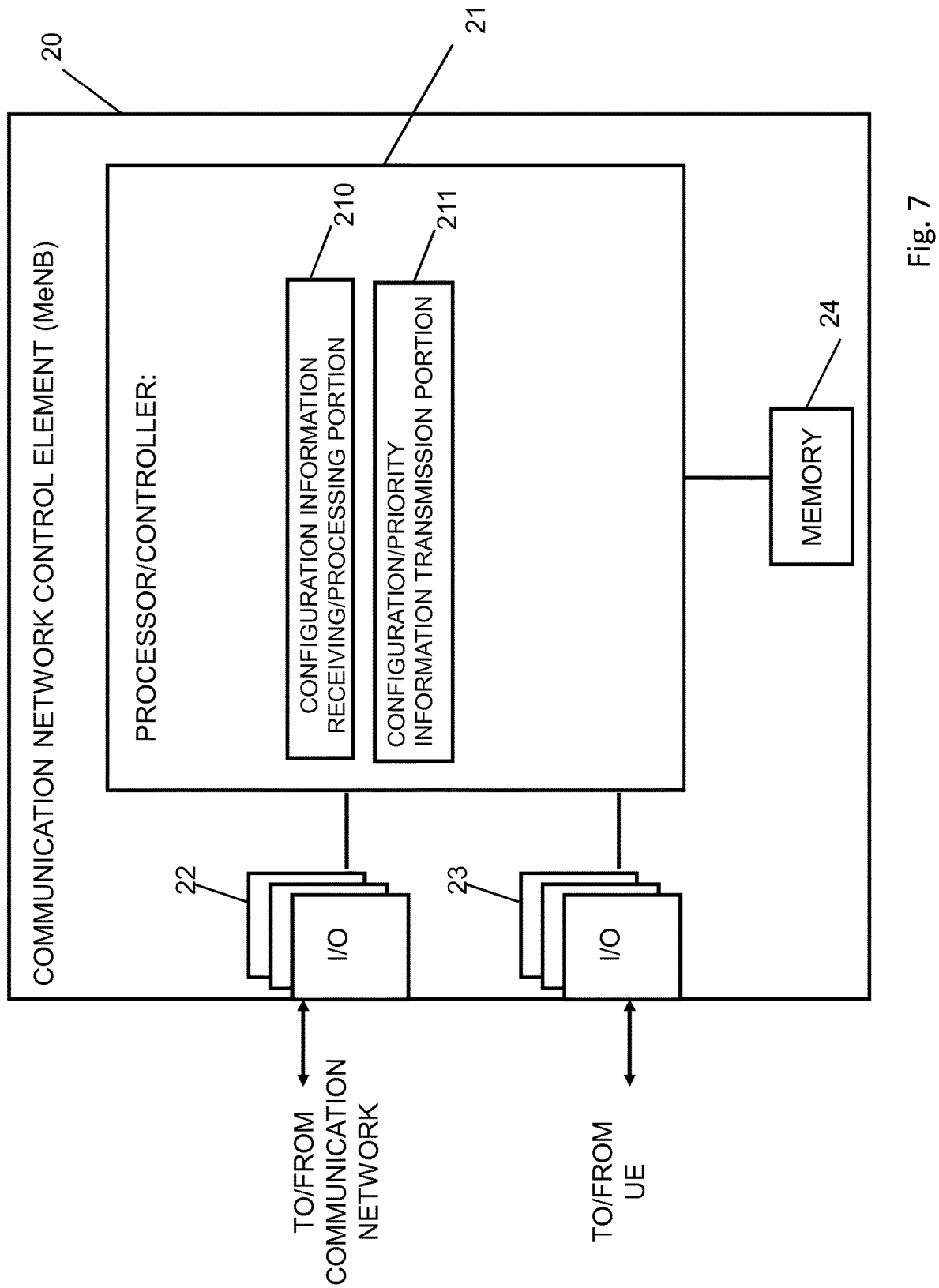
FIG. 7 shows a diagram of a communication network control element or function according to some examples of embodiments.

FIG. 7 shows a diagram of a communication network control element according to some examples of embodiments, which is configured to implement a procedure as described in connection with some of the examples of embodiments. It is to be noted that the communication network control element, like the eNB 20, which is shown in FIG. 7, may include further elements or functions besides those described herein below. Furthermore, even though reference is made to a communication network control element or node, the element or node may be also another device or function having a similar task, such as a chipset, a chip, a module, an application etc., which can also be part of a communication network control element or attached as a separate element to a communication network control element, or the like. It should be understood that each block and any combination thereof may be implemented by various means or their combinations, such as hardware, software, firmware, one or more processors and/or circuitry.

The network element shown in FIG. 7 may include a processing circuitry, a processing function, a control unit or a processor 21, such as a CPU or the like, which is suitable for executing instructions given by programs or the like related to the control procedure. The processor 21 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference signs 22 and 23 denote transceiver or input/output (I/O) units or functions (interfaces) connected to the processor or processing function 21. The I/O units 22 may be used for communicating with other elements of a communication network, such as the communication network as shown in FIG. 1, and in particular with a core network control element or function as described above, such as the MME 50. The I/O units 23 may be used for communicating with communication elements, such as UE 10 as shown in FIG. 1. The I/O units 22 and 23 may be a combined unit including communication equipment towards several network elements, or may include a distributed structure with a plurality of different interfaces for different network elements. Reference sign 24 denotes a memory usable, for example, for storing data and programs to be executed by the processor or processing function 21 and/or as a working storage of the processor or processing function 21. It is to be noted that the memory 24 may be implemented by using one or more memory portions of the same or different type of memory.

The processor or processing function 21 is configured to execute processing related to the above described procedure. In particular, the processor or processing circuitry or function 21 includes one or more of the following sub-portions. Sub-portion 210 is a processing portion which is usable for receiving and processing configuration information related to cell reselection and including the preservation scope. The portion 210 may be configured to perform processing according to S300 of FIG. 4. Furthermore, the processor or processing circuitry or function 21 may include a sub-portion 211 usable as a portion for transmitting the configuration information and cell reselection priority indications to communication elements like the UE 10. The portion 211 may be configured to perform a processing according to S310 of FIG. 4.

Figure 8:
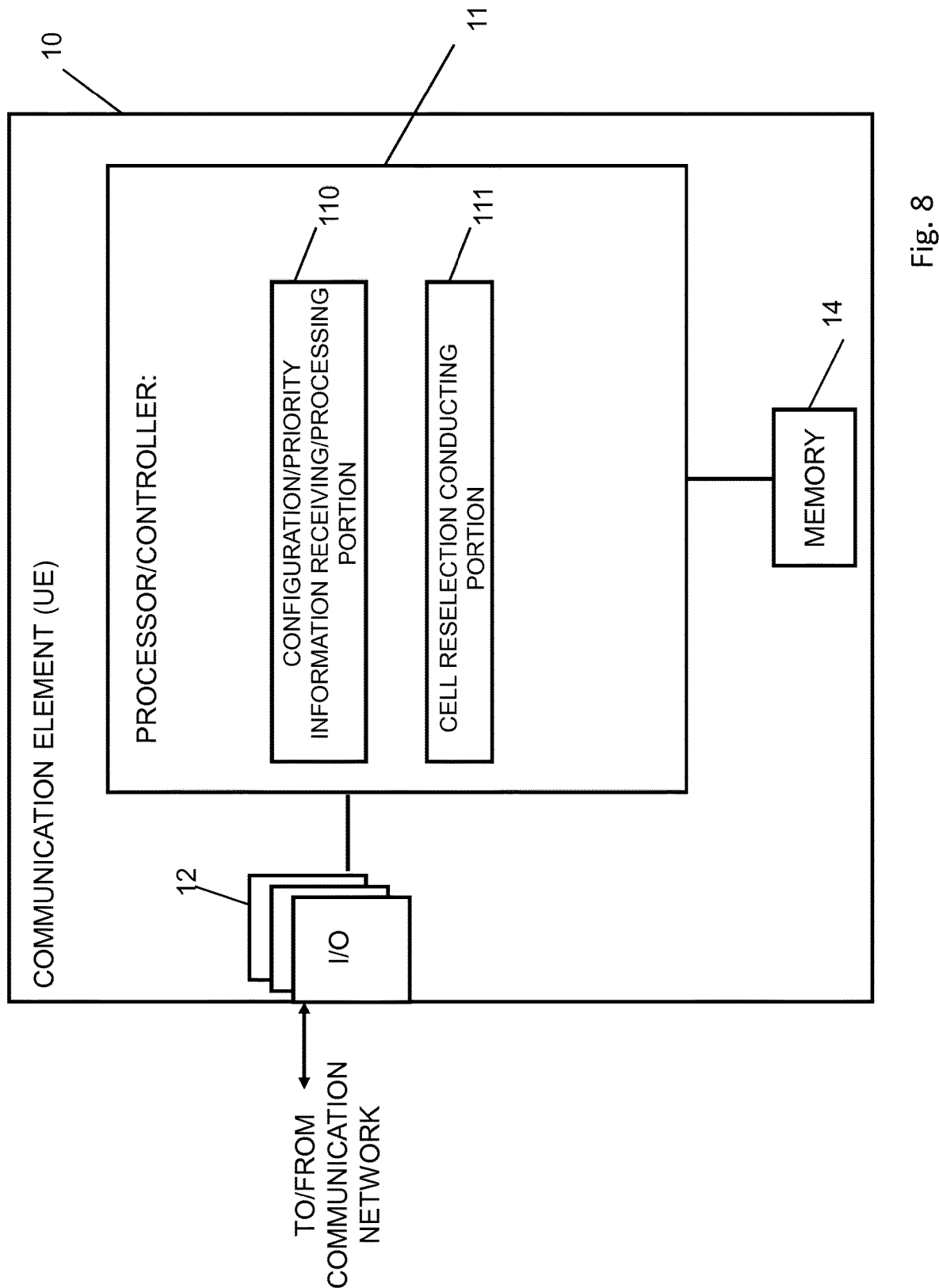
FIG. 8 shows a diagram of a communication element according to some examples of embodiments.

FIG. 8 shows a diagram of a communication element according to some examples of embodiments, which is configured to implement a procedure as described in connection with some of the examples of embodiments. It is to be noted that the communication element, like the UE 10, which is shown in FIG. 8, may include further elements or functions besides those described herein below. Furthermore, even though reference is made to a communication element or node, the element or node may be also another device or function having a similar task, such as a chipset, a chip, a module, an application etc., which can also be part of a network element or attached as a separate element to a communication element, or the like. It should be understood that each block and any combination thereof may be implemented by various means or their combinations, such as hardware, software, firmware, one or more processors and/or circuitry.

The communication element shown in FIG. 8 may include a processing circuitry, a processing function, a control unit or a processor 11, such as a CPU or the like, which is suitable for executing instructions given by programs or the like related to the control procedure. The processor 11 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference sign 12 denotes transceiver or input/output (I/O) units or functions (interfaces) connected to the processor or processing function 11. The I/O units 12 may be used for communicating with network elements of a communication network, such as the communication network as shown in FIG. 1, and in particular with a communication network control element or function as described above, such as the eNB 20. The I/O units 12 may be a combined unit including communication equipment towards several network elements, or may include a distributed structure with a plurality of different interfaces for different network elements. Reference sign 14 denotes a memory usable, for example, for storing data and programs to be executed by the processor or processing function 11 and/or as a working storage of the processor or processing function 11. It is to be noted that the memory 14 may be implemented by using one or more memory portions of the same or different type of memory.

The processor or processing function 11 is configured to execute processing related to the above described procedure. In particular, the processor or processing circuitry or function 11 includes one or more of the following sub-portions. Sub-portion 110 is a processing portion which is usable for receiving and processing configuration information and cell reselection priority indication related to cell reselection. The portion 110 may be configured to perform processing according to S400 of FIG. 5. Furthermore, the processor or processing circuitry or function 11 may include a sub-portion 111 usable as a portion for conducting a cell reselection procedure. The portion 111 may be configured to perform a processing according to S410 of FIG. 5.

It is to be noted that some or all of the examples of embodiments described above may be applied to a partly or fully virtualized environment comprising one or more VNFs.

In addition, according to another example of embodiments, there is provided an apparatus comprising means for preparing configuration information regarding cell reselection in a communication network for at least one communication element capable of communicating in a multi-connectivity communication mode, wherein the configuration information comprises at least one preservation scope indication related to at least one cell reselection priority indication which indicates that priority is to be assigned to a first type of cells of the communication network for cell reselection, compared to other types of cells of the communication network, wherein the at least one preservation scope indication indicates at least one cell across which the at least one cell reselection priority indication is to be maintained, and means for providing the configuration information for configuring the at least one communication element capable of communicating in the multi-connectivity communication mode.

Furthermore, according to some other examples of embodiments, the above defined apparatus may further comprise means for conducting at least one of the processings defined in the above described methods, for example a method according that described in connection with FIG. 3.

In addition, according to another example of embodiments, there is provided an apparatus comprising means for receiving and processing configuration information regarding cell reselection in a communication network for at least one communication element capable of communicating in a multi-connectivity communication mode, wherein the configuration information comprises at least one preservation scope indication related to at least one cell reselection priority indication which indicates that priority is to be assigned to a first type of cells of the communication network for cell reselection, compared to other types of cells of the communication network, wherein the at least one preservation scope indication indicates at least one cell across which the at least one cell reselection priority indication is to be maintained, and means for causing transmission of the configuration information including the at least one preservation scope indication together with at least one cell reselection priority indication to which the at least one preservation scope indication is related, to the at least one communication element capable of communicating in the multi-connectivity communication mode.

Furthermore, according to some other examples of embodiments, the above defined apparatus may further comprise means for conducting at least one of the processings defined in the above described methods, for example a method according that described in connection with FIG. 4.

In addition, according to another example of embodiments, there is provided an apparatus comprising means for receiving and processing configuration information regarding cell reselection in a communication network together with at least one cell reselection priority indication to which the at least one preservation scope indication is related, the at least one cell reselection priority indication indicates that priority is to be assigned to a first type of cells of the communication network for cell reselection, compared to other types of cells of the communication network, wherein the configuration information comprises at least one preservation scope indication related to the at least one cell reselection priority indication, wherein the at least one preservation scope indication indicates at least one cell across which the at least one cell reselection priority indication is to be maintained, and means for conducting a cell reselection procedure considering the configuration information and the at least one cell reselection priority indication.

Furthermore, according to some other examples of embodiments, the above defined apparatus may further comprise means for conducting at least one of the processings defined in the above described methods, for example a method according that described in connection with FIG. 5.

As indicated above, by means of the measures described above, a control mechanism for cell reselection for a DC UE (or multi-connectivity enabled UE) can be provided which enables that a cell reselection priority for DC UE is be different from existing cell reselection priority values, especially in small cell deployments. Thus, redirections for having DC in connected mode can be avoided. Furthermore, with the measures described above according to examples of embodiments, a mechanism is provided with extended scope for dedicated cell reselection priority for the same. In other words, an additional preservation scope for dedicated priorities is provided, so that for cells inside the scope a different reselection behavior can be applied than for cells outside the scope. In addition, by means of the mechanism described according to examples of embodiments, dual connectivity UE can be introduced in existing small cell deployments without impacting ideal mode behavior for legacy UEs.

It is to be noted that according to some examples of embodiments, at the UE side, there is one cell reselection priority configuration being received via dedicated signaling, wherein a preservation scope maps to this configuration. However, it is also conceivable, according to further examples of embodiments, to provide a plurality of corresponding configurations at a UE, wherein in this case each configuration may be provided with a separate preservation scope.

It should be appreciated that an access technology via which traffic is transferred to and from a network element may be any suitable present or future technology, such as WLAN (Wireless Local Access Network), WiMAX (Worldwide Interoperability for Microwave Access), LTE-A, Bluetooth, Infrared, and the like may be used; additionally, embodiments may also apply wired technologies, e.g. IP based access technologies like cable networks or fixed lines, if the technology in question supports cell reselection and multi-connectivity mode.

a user device (also called UE, user equipment, user terminal, terminal device, etc.) illustrates one type of an apparatus to which resources on the air/wired interface may be allocated and assigned, and thus any feature described herein with a user equipment may be implemented with a corresponding apparatus, such as a relay node. An example of such a relay node is a layer 3 relay (self-backhauling relay) towards a base station or eNB. The user device typically refers to a portable computing device that includes wireless mobile communication devices operating with or without a subscriber identification module (SIM), including, but not limited to, the following types of devices: a mobile station (mobile phone), smart phone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network, or a nearly exclusive downlink only device, such as a portable video player. Also equipment used for measuring certain values, such as sensors which can measure a temperature, a pressure etc., can be used as a corresponding user device. It should be appreciated that a device may be regarded as an apparatus or as an assembly of more than one apparatus, whether functionally in cooperation with each other or functionally independently of each other but in a same device housing.

embodiments suitable to be implemented as software code or portions of it and being run using a processor or processing function are software code independent and can be specified using any known or future developed programming language, such as a high-level programming language, such as objective-C, C, C++, C #, Java, Python, Javascript, other scripting languages etc., or a low-level programming language, such as a machine language, or an assembler.

implementation of embodiments is hardware independent and may be implemented using any known or future developed hardware technology or any hybrids of these, such as a microprocessor or CPU (Central Processing Unit), MOS (Metal Oxide Semiconductor), CMOS (Complementary MOS), BiMOS (Bipolar MOS), BiCMOS (Bipolar CMOS), ECL (Emitter Coupled Logic), and/or TTL (Transistor-Transistor Logic).

embodiments may be implemented as individual devices, apparatuses, units, means or functions, or in a distributed fashion, for example, one or more processors or processing functions may be used or shared in the processing, or one or more processing sections or processing portions may be used and shared in the processing, wherein one physical processor or more than one physical processor may be used for implementing one or more processing portions dedicated to specific processing as described, an apparatus may be implemented by a semiconductor chip, a chipset, or a (hardware) module including such chip or chipset;

embodiments may also be implemented as any combination of hardware and software, such as ASIC (Application Specific IC (Integrated Circuit)) components, FPGA (Field-programmable Gate Arrays) or CPLD (Complex Programmable Logic Device) components or DSP (Digital Signal Processor) components.

embodiments may also be implemented as computer program products, including a computer usable medium having a computer readable program code embodied therein, the computer readable program code adapted to execute a process as described in embodiments, wherein the computer usable medium may be a non-transitory medium.

Although the present invention has been described herein before with reference to particular embodiments thereof, the present invention is not limited thereto and various modifications can be made thereto.

The invention claimed is:

1. An apparatus comprising
a processor; and
a non-transitory memory including computer program code, where the memory and computer program code are configured to, with the processor, cause the apparatus to,
transmit, by at least one communication element, a tracking area update message to a base station;
in response to the communication element transitioning from a connected state to an idle state, receive and process configuration information for the tracking area update comprising at least one preservation scope indication and regarding cell reselection in a communication network by the at least one communication element capable of communicating in a multi-connectivity communication mode with two or more access nodes, wherein the configuration information is received from the base station, together with at least one cell reselection priority indication to which the at least one preservation scope indication is related, the at least one cell reselection priority indication indicates that priority is to be assigned to a first type of cells of the communication network corresponding to a first coverage layer for cell reselection while the communication element is in an idle state, compared to at least one other type of cell of the communication network corresponding to at least one other coverage layer, wherein the configuration information comprises at least one preservation scope indication related to the at least one cell reselection priority indication, wherein the at least one preservation scope indication indicates at least one cell across which the at least one cell reselection priority indication is to be maintained when the communication element in an idle state moves into the coverage area of the at least one cell;
select at least one cell by conducting a cell reselection procedure considering the configuration information and the at least one cell reselection priority indication;
determine whether a cell currently being a serving cell is part of the at least one cell indicated in the preservation scope indication;
use, if the determination is positive, the at least one cell reselection priority indication to which the preservation scope indication is related, as at least one of criteria for the cell reselection procedure; and
use, if the determination is negative, at least one default cell reselection priority indication as a criteria for the cell reselection procedure.

2. The apparatus according to claim 1, wherein the memory and computer program code are further configured to, with the processor, cause the apparatus
to maintain, when conducting the cell reselection procedure considering the configuration information and the at least one cell reselection priority indication, the indicated at least one cell reselection priority in the at least one cell indicated in the preservation scope indication.

3. The apparatus according to claim 1, wherein the apparatus is included in the communication element capable of communicating in a multi-connectivity communication mode, the communication element including at least one of a terminal device or user equipment (UE), wherein the configuration information and the at least one cell reselection priority indication are received from a communication network control element or function configured to act as a base station or evolved node B (Me NB) of the communication network.

4. The apparatus according to claim 1, wherein the configuration information is related to a configuration of the at least one communication element capable of communicating in the multi-connectivity communication mode in an idle state, wherein the at least one cell reselection priority indication is signaled by a dedicated cell reselection priority configuration signaling.

5. The apparatus according to claim 1, wherein the configuration information further comprises timer information indicating a time during which the at least one preservation scope indication or the at least one cell reselection priority indication is valid, wherein the memory and computer program code are further configured to, with the processor, cause the apparatus
to trigger a timer according to the timer information, wherein at an expiry of the timer the configuration information is discarded, or
to receive the timer information together with the configuration information at the at least one communication element.

6. The apparatus according to claim 1, wherein the configuration information is at least one of
received by one of an access stratum signaling, a non-access stratum signaling, or a radio resource control configuration signaling.

7. The apparatus according to claim 1, wherein the at least one preservation scope indication includes, for indicating the at least one cell across which the at least one cell reselection priority indication is to be maintained, at least one of a tracking area, an absolute radio frequency channel number or a channel identifier.

8. The apparatus according to claim 1, wherein the first type of cells of the communication network includes cells of a macro-cell layer of a heterogeneous network structure of the communication network.

9. A method comprising
transmitting, by at least one communication element, a tracking area update message to a base station;

in response to the communication element transitioning from a connected state to an idle state, receiving and processing configuration information for the tracking area update comprising at least one preservation scope indication and regarding cell reselection in a communication network by the at least one communication element capable of communicating in a multi-connectivity communication mode with two or more access nodes, wherein the configuration information is received from the base station, together with at least one cell reselection priority indication to which the at least one preservation scope indication is related, the at least one cell reselection priority indication indicates that priority is to be assigned to a first type of cells of the communication network corresponding to a first coverage layer for cell reselection while the communication element is in an idle state, compared to at least one other type of cell of the communication network corresponding to at least one other coverage layer, wherein the configuration information comprises at least one preservation scope indication related to the at least one cell reselection priority indication, wherein the at least one preservation scope indication indicates at least one cell across which the at least one cell reselection priority indication is to be maintained when the communication element in an idle state moves into the coverage area of the at least one cell;

select at least one cell by conducting a cell reselection procedure considering the configuration information and the at least one cell reselection priority indication;

determine whether a cell currently being a serving cell is part of the at least one cell indicated in the preservation scope indication;

use, if the determination is positive, the at least one cell reselection priority indication to which the preservation scope indication is related, as at least one of criteria for the cell reselection procedure; and use, if the determination is negative, at least one default cell reselection priority indication as a criteria for the cell reselection procedure.

10. The method according to claim 9, further comprising maintaining, when conducting the cell reselection procedure considering the configuration information and the at least one cell reselection priority indication, the indicated at least one cell reselection priority in the at least one cell indicated in the preservation scope indication.

11. The method according to claim 9, performed with a communication element capable of communicating in a multi-connectivity communication mode, the communication element including at least one of a terminal device or user equipment (UE), wherein the configuration information and the at least one cell reselection priority indication are received from a communication network control element or function configured to act as a base station or evolved node B (Me NB) of the communication network.

12. The method according to claim 9, wherein the configuration information is related to a configuration of the at least one communication element capable of communicating in the multi-connectivity communication mode in an idle state, wherein the at least one cell reselection priority indication is signaled by a dedicated cell reselection priority configuration signaling.

13. The method according to claim 9, wherein the configuration information further comprises timer information indicating a time during which the at least one preservation scope indication or the at least one cell reselection priority indication is valid, and further comprising triggering a timer according to the timer information, wherein at an expiry of the timer the configuration information is discarded, or receiving the timer information together with the configuration information at the at least one communication element.

14. The method according to claim 9, wherein the configuration information is at least one of received by one of an access stratum signaling, a non-access stratum signaling, or a radio resource control configuration signaling.

15. The method according to claim 9, wherein the at least one preservation scope indication includes, for indicating the at least one cell across which the at least one cell reselection priority indication is to be maintained, at least one of a tracking area, an absolute radio frequency channel number or a channel identifier.

16. The method according to claim 9, wherein the first type of cells of the communication network includes cells of a macro-cell layer of a heterogeneous network structure of the communication network.

17. A computer program product embodied on a non-transitory computer-readable medium in which a computer program is stored that, when being executed by a computer, is configured to provide instructions to control or carry out the method of claim 9.

18. An apparatus comprising a processor; and a non-transitory memory including computer program code, where the memory and computer program code are configured to, with the processor, cause the apparatus to, receive, by a base station, a tracking area update message from at least one communication element;

in response to the communication element transitioning from a connected state to an idle state, transmit for processing configuration information for the tracking area update comprising at least one preservation scope indication and regarding cell reselection in a communication network by the at least one communication element capable of communicating in a multi-connectivity communication mode with two or more access nodes, wherein the configuration information is transmitted from the base station, together with at least one cell reselection priority indication to which the at least one preservation scope indication is related, the at least one cell reselection priority indication indicates that priority is to be assigned to a first type of cells of the communication network corresponding to a first coverage layer for cell reselection while the communication element is in an idle state, compared to at least one other type of cell of the communication network corresponding to at least one other coverage layer, wherein the configuration information comprises at least one preservation scope indication related to the at least one cell reselection priority indication, wherein the at least one preservation scope indication indicates at least one cell across which the at least one cell reselection priority indication is to be maintained when the communication element in an idle state moves into the coverage area of the at least one cell;

wherein at least one cell is selected by conducting a cell reselection procedure considering the configuration information and the at least one cell reselection priority indication;

wherein whether a cell currently being a serving cell is part of the at least one cell indicated in the preservation scope indication is determined;
wherein if the determination is positive, the at least one cell reselection priority indication to which the preservation scope indication is related is used as at least one of criteria for the cell reselection procedure; and
wherein if the determination is negative, at least one default cell reselection priority indication is used as a criteria for the cell reselection procedure.

19. The apparatus according to claim 18, wherein when conducting the cell reselection procedure considering the configuration information and the at least one cell reselection priority indication, the indicated at least one cell reselection priority in the at least one cell indicated in the preservation scope indication is maintained.

20. The apparatus according to claim 18, wherein the communication element is capable of communicating in a multi-connectivity communication mode, the communication element including at least one of a terminal device or user equipment (UE).

21. The apparatus according to claim 18, wherein the configuration information is related to a configuration of the at least one communication element capable of communicating in the multi-connectivity communication mode in an idle state, wherein the at least one cell reselection priority indication is signaled by a dedicated cell reselection priority configuration signaling.

22. The apparatus according to claim 18, wherein the configuration information further comprises timer information indicating a time during which the at least one preservation scope indication or the at least one cell reselection priority indication is valid, wherein:
a timer is triggered according to the timer information, wherein at an expiry of the timer the configuration information is discarded, or
the timer information is transmitted together with the configuration information to the at least one communication element.

23. The apparatus according to claim 18, wherein the configuration information is at least one of
transmitted by one of an access stratum signaling, a non-access stratum signaling, or a radio resource control configuration signaling.

24. The apparatus according to claim 18, wherein the at least one preservation scope indication includes, for indicating the at least one cell across which the at least one cell reselection priority indication is to be maintained, at least one of a tracking area, an absolute radio frequency channel number or a channel identifier.

25. The apparatus according to claim 18, wherein the first type of cells of the communication network includes cells of a macro-cell layer of a heterogeneous network structure of the communication network.

26. A method comprising
transmitting, by a base station, a tracking area update message to a at least one communication element;
in response to the communication element transitioning from a connected state to an idle state, transmitting for processing configuration information for the tracking area update comprising at least one preservation scope indication and regarding cell reselection in a communication network by the at least one communication element capable of communicating in a multi-connectivity communication mode with two or more access nodes, wherein the configuration information is transmitted from the base station, together with at least one cell reselection priority indication to which the at least one preservation scope indication is related, the at least one cell reselection priority indication indicates that priority is to be assigned to a first type of cells of the communication network corresponding to a first coverage layer for cell reselection while the communication element is in an idle state, compared to at least one other type of cell of the communication network corresponding to at least one other coverage layer, wherein the configuration information comprises at least one preservation scope indication related to the at least one cell reselection priority indication, wherein the at least one preservation scope indication indicates at least one cell across which the at least one cell reselection priority indication is to be maintained when the communication element in an idle state moves into the coverage area of the at least one cell;
wherein at least one cell by conducting a cell reselection procedure considering the configuration information and the at least one cell reselection priority indication is selected;
wherein whether a cell currently being a serving cell is part of the at least one cell indicated in the preservation scope indication is determined;
wherein, if the determination is positive, the at least one cell reselection priority indication to which the preservation scope indication is related is used as at least one of criteria for the cell reselection procedure; and
wherein, if the determination is negative, at least one default cell reselection priority indication is used as a criteria for the cell reselection procedure.

27. The method according to claim 26, further comprising maintaining, when conducting the cell reselection procedure considering the configuration information and the at least one cell reselection priority indication, the indicated at least one cell reselection priority in the at least one cell indicated in the preservation scope indication.

28. The method according to claim 26, wherein the communication element is capable of communicating in a multi-connectivity communication mode, the communication element including at least one of a terminal device or user equipment (UE).

29. The method according to claim 26, wherein the configuration information is related to a configuration of the at least one communication element capable of communicating in the multi-connectivity communication mode in an idle state, wherein the at least one cell reselection priority indication is signaled by a dedicated cell reselection priority configuration signaling.

30. The method according to claim 26, wherein the configuration information further comprises timer information indicating a time during which the at least one preservation scope indication or the at least one cell reselection priority indication is valid, and further comprising
wherein a timer is triggered according to the timer information, wherein at an expiry of the timer the configuration information is discarded, or
transmitting the timer information together with the configuration information to the at least one communication element.

31. The method according to claim 26, wherein the configuration information is at least one of
transmitted by one of an access stratum signaling, a non-access stratum signaling, or a radio resource control configuration signaling.

32. The method according to claim 26, wherein the at least one preservation scope indication includes, for indicating the at least one cell across which the at least one cell reselection priority indication is to be maintained, at least one of a tracking area, an absolute radio frequency channel number or a channel identifier.

33. The method according to claim 26, wherein the first type of cells of the communication network includes cells of a macro-cell layer of a heterogeneous network structure of the communication network.

34. A computer program product embodied on a non-transitory computer-readable medium in which a computer program is stored that, when being executed by a computer, is configured to provide instructions to control or carry out the method of claim 26.

* * * * *